United States Patent

Mueller et al.

[11] Patent Number: 5,868,427
[45] Date of Patent: Feb. 9, 1999

[54] TRIGGERING CIRCUIT FOR A PASSENGER RESTRAINT SYSTEM

[75] Inventors: Manfred Mueller, Deizisau; Harald Rudolf, Tuebingen; Michael Meyer, Sindelfingen; Frank Zerrweck, Stuttgart, all of Germany

[73] Assignee: Daimler-Benz Aktiengesellschaft, Stuttgart, Germany

[21] Appl. No.: 880,682

[22] Filed: Jun. 23, 1997

[30] Foreign Application Priority Data

Jun. 22, 1996 [DE] Germany ............... 196 25 004.8

[51] Int. Cl.$^6$ .................. B60R 22/46; B60R 22/48
[52] U.S. Cl. ................ 280/806; 280/735; 180/282; 701/46
[58] Field of Search .................. 280/735, 806; 180/282; 701/45, 46; 307/10.1

[56] References Cited

U.S. PATENT DOCUMENTS

| | | | |
|---|---|---|---|
| 4,985,835 | 1/1991 | Sterler et al. | 280/735 |
| 5,157,268 | 10/1992 | Spies et al. | 280/735 |
| 5,326,146 | 7/1994 | Takeuchi | 280/735 |
| 5,430,649 | 7/1995 | Cashler et al. | 701/46 |
| 5,445,413 | 8/1995 | Rudolf et al. | 280/735 |
| 5,461,567 | 10/1995 | Kelley et al. | 701/45 |
| 5,540,461 | 7/1996 | Nitschke et al. | 280/735 |

FOREIGN PATENT DOCUMENTS

| | | |
|---|---|---|
| 0 517 253 | 12/1992 | European Pat. Off. . |
| 39 42 011 | 7/1991 | Germany . |
| 43 30 486 | 3/1995 | Germany . |

*Primary Examiner*—Peter C. English
*Attorney, Agent, or Firm*—Evenson, McKeown, Edwards & Lenahan, P.L.L.C.

[57] ABSTRACT

A triggering circuit for a passenger restraint system for motor vehicles is provided with at lest one belt tightener for tightening a safety belt associated with a vehicle seat. A triggering circuit evaluates the acceleration signal from an accelerometer and delivers a triggering signal to the belt tightener when a critical impact is detected. An evaluation channel detects a rear-end collision. In the evaluation channel, on the basis of the acceleration signal that appears in the event of a rear-end collision, a travel signal that characterizes backward displacement of the passenger is determined that permits the triggering signal to be output to the belt tightener when a threshold value is exceeded.

7 Claims, 1 Drawing Sheet

TRIGGERING CIRCUIT FOR A PASSENGER RESTRAINT SYSTEM

BACKGROUND AND SUMMARY OF THE INVENTION

This application claims the priority of German Application No. 196 25 004.8, the disclosure of which is expressly incorporated by reference herein.

The invention relates to a triggering circuit for a passenger restraint system for motor vehicles and, more particularly, to a triggering circuit for a passenger restraint system for motor vehicles with at least one belt tightener for tightening a safety belt associated with a vehicle seat. The triggering circuit evaluates the acceleration signal from an accelerometer and delivers a triggering signal to the belt tightener when a critical collision is detected.

A triggering circuit for a passenger restraint system, especially a driver airbag, is known from German Patent document DE 39 42 011 A1 (corresponding to U.S. Pat. No. 5,157,268, the disclosure of which is expressly incorporated by reference herein). In this system, the electrical acceleration signal of an accelerometer is integrated several times using a special integration method and results in the triggering of the restraint system provided certain thresholds are simultaneously exceeded by the various integrals. This triggering circuit is designed exclusively for triggering the restraint system in the event of a front-end collision. Although the triggering circuit has an evaluation channel for detecting a rear-end collision, this channel serves to suppress improper triggering of the restraint system in the event of a rear-end collision. A threshold for the integral of the inverting acceleration signal is set for detecting a rear-end collision.

In addition, a safety belt system with a locking device for locking the safety belt when the motor vehicle is involved in a front-end or rear-end crash is known from German Patent document DE 44 28 921 A1. The locking device is controlled by a crash detector, which is not specified any further, to detect a front-end or rear-end crash. The function of the crash detector, especially the types of triggering criteria in a rear-end crash, are not disclosed in this reference.

In a rear-end collision, the vehicle occupants are endangered primarily by two effects: in the ramp effect, the passenger slides upward along the seat back following a rear-end collision and can strike the roof with his/her head. In the rebound effect the passenger is flung forward after being pressed into the seat back and can strike the steering wheel with his/her head. The risk of injury in a rear-end collision can be reduced by triggering the belt tightener, provided the belt tightener is triggered at the correct point in time. This requirement is more stringent for the case when the rear-end collision is followed by a front-end collision that triggers the airbag.

The goal of the invention is to provide an evaluation channel with a suitable method for a triggering circuit, by which channel a critical rear-end collision can be reliably detected and the belt tightener triggered at a point in time at which an optimum protective effect can be achieved.

This goal is achieved in the triggering circuit for a passenger restraint system for motor vehicles with at least one belt tightener for tightening a safety belt associated with a vehicle seat. The triggering circuit evaluates the acceleration signal from an accelerometer and delivers a triggering signal to the belt tightener when a critical collision is detected. The triggering circuit comprises an,evaluation channel for detecting a rear-end collision. The channel includes a backward displacement determination stage with which a travel signal that characterizes the backward displacement of a passenger can be determined on the basis of the acceleration signal that appears in the event of a rear-end collision. The channel also includes a travel threshold value switch connected downstream of the backward displacement determination stage for the travel signal that sets a high signal when a backward displacement threshold value is exceeded by the travel signal. The presence of this high signal is necessary in the event of a rear-end collision for the triggering signal to be output to the belt tightener. In the method for use with the triggering circuit, a travel signal is determined that characterizes the backward displacement of the passenger by means of two integrations from an acceleration signal that occurs in the event of a rear-end collision. The travel signal is compared with a backward displacement threshold value. The triggering signal is output to the belt tightener when threshold value is exceeded.

The advantages of the invention over the prior art consist in the fact that the triggering point in time is not linked to abstract thresholds for accelerations or speeds, but rather the rearward displacement of the passenger in a rear-end collision, calculated from the acceleration signal by double integration, is used as the required triggering criterion. Rearward displacement describes the change in position of the passenger during the collision and is therefore the primary parameter for evaluating the risk to the vehicle passenger. In addition, rearward displacement is a graphic parameter that can be read directly from films of rear-end collision tests.

Although it is known from the literature, especially the above-mentioned German Patent document DE 39 42 011 A1, to use the forward displacement of the passenger in a front-end collision calculated from the acceleration signal by double integration as the criterion for triggering for an airbag, this has not worked well in practice. The long time required for the airbag to deploy means that in a front-end collision the triggering decision must be made very early so that the forward-displacement value that is calculated is still insufficiently accurate to be able to couple the triggering decision to it. This problem is addressed in German Patent document DE 43 30 486 A1 (corresponding to U.S. Pat. No. 5,445,413, the disclosure of which is expressly incorporated by reference herein), for example. Therefore, in the triggering circuits that are predominantly in use today, forward displacement of the passenger is not used to determine the triggering point in time.

However, the present invention recognizes that other conditions prevail in a rear-end collision. From films of rear-end collision tests, a rearward displacement of approximately 400 mm has been determined to be the optimum triggering criterion. With this backward displacement, the backward displacement movement of the passenger has reached its reversal point, so that the belt of the passenger has been deployed to the maximum extent and, after the belt tightener is triggered, its tightening distance can be utilized to the maximum. In the following phase involving rebounding toward the steering wheel, the passenger is restrained as soon as possible by the tightened belt. With the above-mentioned triggering criterion, depending on the speed of impact, triggering times in the range from 80 ms to 120 ms have been found.

Since the time between triggering and completion of the tightening process is comparatively short at approximately 7 ms, a rearward displacement threshold value of 400 mm can be used for the backward displacement movement modeled in the triggering circuit as a triggering criterion without deduction. At the triggering point in time, the travel signal derived from the acceleration signal by double integration is at its highest pitch for backward displacement, so that good accuracy and reproducibility of the triggering point is achieved. Using the triggering criterion thus generated, triggering of the belt tightener occurs only in a rear-end collision at a speed of more than 15 km/h. At a lower impact speed, the travel signal that is generated does not reach the set backward-displacement threshold value of 400 mm.

In one advantageous improvement, the exceeding of a speed threshold value by the speed signal derived by simple integration of the acceleration signal is used as a triggering criterion that must simultaneously be met with the rearward displacement threshold value. This signal characterizes the increase in the weight of the vehicle that takes place in a rear-end collision and is therefore a measure of the severity of the rear-end collision. The increase in speed reaches its end value, specified by the principle of linear momentum for the inelastic collision for average impact speeds of approximately 30 km/h at approximately 80 msec and even earlier at higher impact speeds. In this way, the maximum speed increase is reached for the case in which triggering is desired at a point in time at which the backward displacement threshold value is exceeded by the travel signal. Therefore, the severity of the rear-end collision that causes triggering is determined exactly and reproducibly using the threshold value that the speed signal must exceed if triggering is to occur. This permits a sharp delimitation from a rear-end collision with a low impact energy. The exact value of the speed threshold is determined from films of rear-end collision tests and the damage done to the test vehicles.

Other objects, advantages and novel features of the present invention will become apparent from the following detailed description of the invention when considered in conjunction with the accompanying drawings.

DETAILED DESCRIPTION OF THE DRAWINGS

Figure 1:
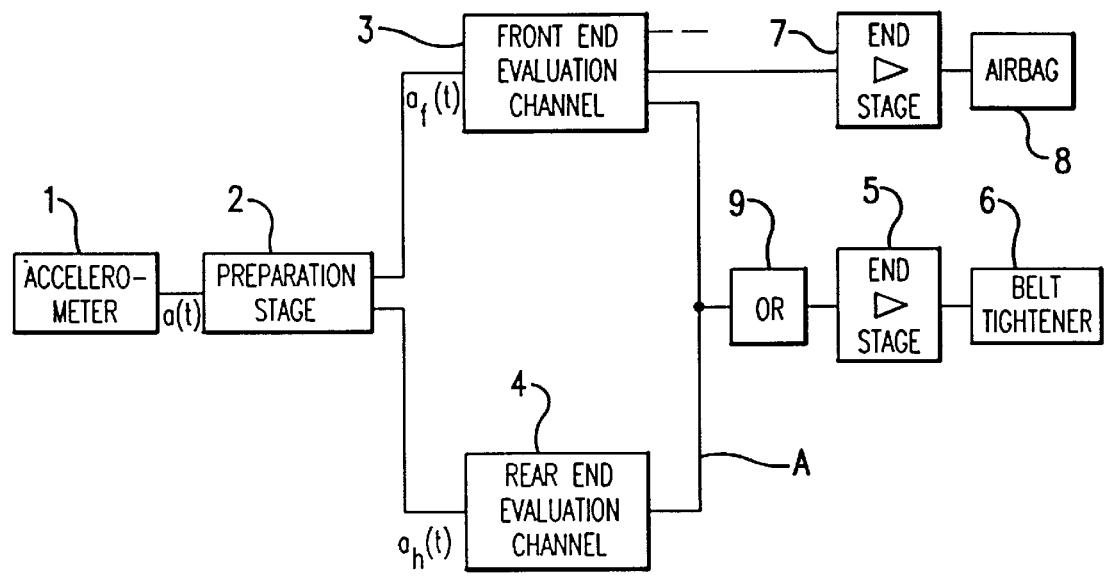
FIG. 1 is a block diagram of the triggering circuit for a passenger restraint system with an evaluation channel for detecting a rear-end collision.

The general design of the triggering circuit is shown in the block diagram in FIG. 1. The starting signal a(t) of an accelerometer 1 is amplified, smoothed, limited, and divided in suitable fashion into a rear-end collision acceleration signal $a_h(t)$ and a front-end collision acceleration signal $a_f(t)$ in a preparation stage 2 in a known manner, for example by means of supplementary asymmetrical limitation. Since the acceleration values that occur in a rear-end collision are typically in the range of –5 g to 20 g and are positive on the average while the acceleration values that occur in a front-end collision are negative on the average, the acceleration signal for the rear-end collision $a_h(t)$ is output inverted. Thus, the measures and circuits known from the evaluation of a front-end collision can be used for further evaluation of the rear-end collision. Therefore, reference is made to German Patent document DE 39 42 011 A1 already mentioned above for the details of the methods described below for integration and signal processing.

The front-end collision acceleration signal $a_f(t)$ is fed to a front-end collision evaluation channel 3 and further processed there. The front-end collision evaluation channel 3 operates in a known manner and, in the event of a critical front-end collision, controls an end stage 5 associated with belt tightener 6 by a triggering signal. A driver airbag 8 may possibly be controlled as well through a second end stage 7. Additional restraints such as a passenger airbag or side airbag can be provided (indicated by the dashed line in FIG. 1).

The rear-end collision acceleration signal $a_h(t)$ is fed to a rear-end collision evaluation channel 4. Rear-end collision evaluation channel 4 operates in the manner described below and, in the event of a critical rear-end collision, controls end stage 5 associated with belt tightener 6 by a triggering signal A. The triggering signals that can be delivered by the two evaluation channels 3, 4 are combined in an OR element 9.

Figure 2:
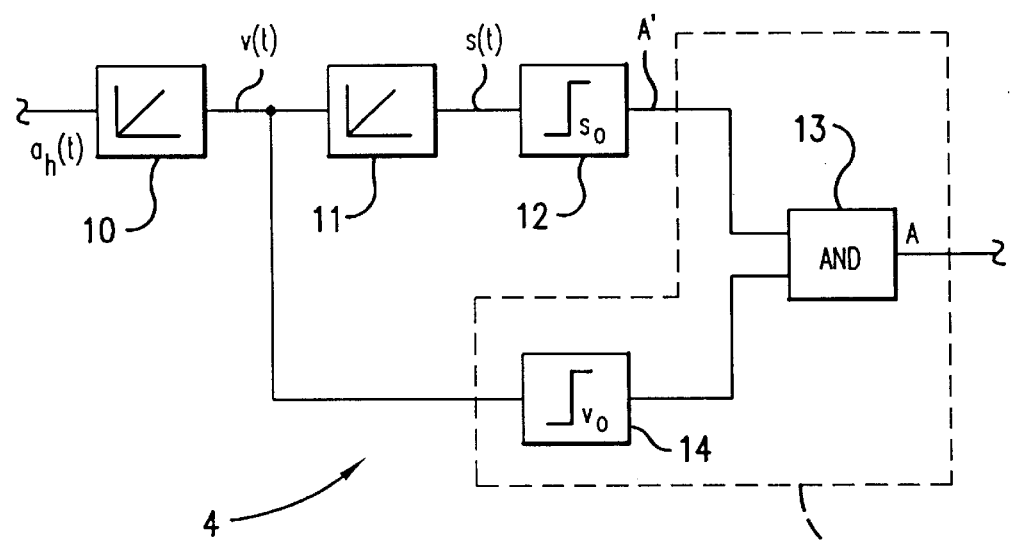
FIG. 2 is an embodiment of the evaluation channel according to the invention.

Rear-end collision evaluation channel 4 for detecting a rear-end collision is shown in detail in FIG. 2. In its simplest form it comprises a backward displacement determination stage 10, 11 by which a travel signal s(t) that characterizes the rearward displacement of the passenger can be determined on the basis of the acceleration signal $a_h(t)$ that appears in the event of a rear-end collision. Rearward displacement determination stage 10, 11 is followed by a travel threshold value switch 12 for travel signal s(t), which sets a high signal when a backward displacement threshold value $s_0$ is exceeded by travel signal s(t). In general, travel signal s(t) can be obtained by double integration from acceleration signal $a_h(t)$, and special integration methods with weighted integrands or with an integrand threshold can be used as well, if the typical signal pattern of the acceleration signal $a_h(t)$ makes this necessary.

In the embodiment, backward displacement is determined in two stages 10, 11. Initially, acceleration signal $a_h(t)$ is fed to a first integrator stage 10 at whose output a speed signal v(t) therefore appears and is fed to a second integrator stage 11. Therefore, a travel signal s(t) appears at the output of second integrator stage 11 that characterizes the backward displacement of the passenger in a rear-end collision. The optimum value for the backward displacement threshold value $s_0$ can be determined from films of rear-end collision tests and is approximately 400 mm. In the simplest embodiment, the output signal A' of travel threshold value switch 12 can be fed to the input of OR member 9 in FIG. 1 and can serve as a triggering signal to control end stage 5 of belt tightener 6. However, if additional triggering criteria must be applied, output signal A' can be used in such fashion that in the event of a rear-end collision the existence of a high signal at the output of travel threshold value switch 12 is required to output the triggering signal to belt tightener 6 through OR member 9 and associated end stage 5.

In the advantageous improvement shown surrounded by the dashed lines 20 in FIG. 2, the output signal A' of travel threshold value switch 12 is fed to a first input of an AND member 13. The output signal of a speed threshold value switch 14 is fed to the second input of AND member 13, setting a high signal when a speed threshold value $v_0$ is exceeded by a speed signal v(t) that characterizes the increase in the vehicle speed that takes place in a rear-end collision. The output signals of travel threshold value switch 12 and speed threshold value switch 14 are linked logically with one another and with AND element 13 so that in the event of a rear-end collision both signals must be high to output the triggering signal A to trigger the belt tightener. In general, the speed signal v(t) can be determined in a speed increase determination stage on the basis of the rear-end collision acceleration signal $a_h(t)$ by integration.

In the embodiment, the speed signal v(t) can be tapped-off directly at the output of first integrator stage 10, which therefore constitutes the speed increase determination stage. This embodiment offers the advantages already outlined above, namely that in a rear-end collision the belt tightener is triggered only if the speed increase that has suddenly taken place as the result of a rear-end collision is sufficiently high, with the optimum triggering point in time being determined by the criterion of backward displacement of the passenger.

So that when there are no forces, which in this case means normal driving with the acceleration values a(t) within a band from −2 g to +2 g, the values do not rise without limit and exceed the set thresholds during integral formation in the two integrator stages 10, 11, but without there being any rear-end collision, suitable measures must be employed to reset the speed and travel signals. For example a deduction from travel at a constant rate can take place, with a rate of 1 m/s being a realistic value. Reference is made to German Patent document DE 43 30 486 A1 mentioned above in connection with other information that relates to the problem of resetting.

The block diagram shown in the drawing relates to an implementation of the triggering circuit according to the invention by circuit components that correspond to the blocks. The idea of the invention is also possible for conditions involving digital triggering devices with programmable triggering algorithms, with corresponding method steps being implemented in the triggering algorithm.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A trigger circuit for a passenger restraint system for a motor vehicle in which at least one belt tightener for tightening a safety belt associated with a vehicle seat is provided, said trigger circuit evaluating an acceleration signal from an accelerometer and delivering a triggering signal to the belt tightener when a critical collision is detected, the trigger circuit comprising:

an evaluation channel for detecting a rear-end collision;

wherein said evaluation channel includes a backward displacement determination stage in which a travel signal characterizing a backward displacement of a passenger is determined on a basis of the acceleration signal occurring in an event of the rear-end collision;

further wherein said evaluation channel includes a travel threshold value switch for said travel signal, said travel threshold value switch being coupled to an output of said backward displacement determination stage and setting a high signal when a backward displacement threshold value is exceeded by said travel signal; and wherein a presence of said high signal is required in the event of the rear-end collision in order to output the triggering signal to the belt tightener.

2. The trigger circuit according to claim 1, wherein said evaluation channel further comprises:

a speed increase determination stage, said speed increase determination stage determining a speed signal which characterizes an increase in the motor vehicle speed on a basis of the acceleration signal occurring in the event of the rear-end collision;

a speed threshold value switch for the speed signal, said speed threshold value switch being connected to an output from said speed increase determination stage and setting a high speed signal when a speed threshold value is exceeded by said speed signal, and an AND member logically linking output signals of said travel threshold value switch and said speed threshold value switch with one another such that in the event of the rear-end collision, both the high signal and the high speed signal must be present for the triggering signal to be output to the belt tightener.

3. The trigger circuit according to claim 2, wherein said speed increase determination stage is formed from a first integrator stage.

4. The trigger circuit according to claim 3, wherein said backward displacement determination stage includes a first integrator stage coupled in series with a second integrator stage.

5. The trigger circuit according to claim 1, wherein said backward displacement determination stage includes a first integrator stage coupled in series with a second integrator stage.

6. A method for operating a trigger circuit for a passenger restraint system for a motor vehicle having at least one belt tightener for tightening a safety belt associated with a vehicle seat in which an acceleration signal from an accelerometer is evaluated and a triggering signal is output to the belt tightener if a critical impact is detected, the method comprising the steps of:

determining a travel signal characteristic of a backward displacement of a passenger, said travel signal being determined via two integrations of an acceleration signal occurring in an event of a rear-end collision;

comparing said travel signal with a backward displacement threshold value; and outputting the triggering signal to the belt tightener when the backward displacement threshold value is exceeded by said travel signal.

7. The method according to claim 6, further comprising the steps of:

determining a speed signal characteristic of an increase in the speed of the motor vehicle, said speed signal being determined from the acceleration signal occurring in the rear-end collision via an integration;

comparing said speed signal with a speed threshold value;

outputting the triggering signal to the belt tightener when the speed threshold value is exceeded by the speed signal and the backward displacement threshold value is simultaneously exceeded by the travel signal.

* * * * *